United States Patent [19]

Maiwald

[11] Patent Number: 5,397,036
[45] Date of Patent: Mar. 14, 1995

[54] CALIBRATED VESSEL HAVING A HANDLE WHICH ALSO SERVES AS A DELIVERY ELEMENT

[76] Inventor: Manfred Maiwald, P.O. Box 19211, Seattle, Wash. 98111-1921

[21] Appl. No.: 149,537

[22] Filed: Nov. 9, 1993

[51] Int. Cl.6 .................. B65D 83/00; G01F 19/00
[52] U.S. Cl. ...................... 222/475; 220/608; 220/672; D10/46.2; D7/691; 73/427
[58] Field of Search .......... 73/427; D10/46.2, 46.3; D7/691; 30/324; 222/475; 220/672, 608

[56] References Cited

U.S. PATENT DOCUMENTS

| | | | |
|---|---|---|---|
| 217,050 | 7/1879 | Block | 73/427 |
| 641,052 | 1/1900 | Strauss | 73/427 |
| 1,564,470 | 12/1925 | Crimmel | 73/427 |
| 2,673,664 | 3/1954 | Boysen | 222/475 |
| 2,687,628 | 8/1954 | Cunningham | 222/475 |
| 3,217,948 | 11/1965 | Mullen | 222/475 |
| 3,233,783 | 2/1966 | Thornton | 222/475 |
| 4,171,075 | 10/1979 | Gangwisch | 222/475 |
| 4,292,846 | 10/1981 | Barnett | 73/427 |

FOREIGN PATENT DOCUMENTS 0041550  1/1908  Switzerland ................. 73/427

Primary Examiner—Diego F. F. Gutierrez
Attorney, Agent, or Firm—Robert W. Jenny

[57] ABSTRACT

The vessel has a cup shaped portion having a spout extending essentially horizontally from the lip of the cup shaped portion with the vessel upright. The spout is long enough to serve as a handle used for filling the vessel by dipping the vessel into the material or liquid to be measured and dispensed. One part of the cup portion is stepped such that each step indicates a specific fraction of the vessel's full working content.

1 Claim, 1 Drawing Sheet

CALIBRATED VESSEL HAVING A HANDLE WHICH ALSO SERVES AS A DELIVERY ELEMENT

BACKGROUND OF THE INVENTION

1. Field

The subject invention is in the field of calibrated containers such as measuring cups, the field of vessels having spouts, such as teapots and watering cans and the field of delivery passages such as funnels and troughs. For purposes of this disclosure, unless otherwise specified the term delivery element includes spouts, troughs and channels. More specifically, it is in the field of calibrated vessels having delivery elements.

2. Prior Art

There is much prior art in these general and specific fields, much of it not patented. The prior art known to the inventor of the subject invention and closest to the subject invention includes measuring cups having handles and small vessels having both handles and spouts such as vessels used for watering plants. None of the known vessels of these types is well adapted to measuring and dispensing granular material such as gravel and birdseed. Vessels used for dispensing birdseed are dipped into the seeds to fill the vessel, preferably using a handle on the vessel. This preferred filling technique is more difficult or possibly not feasible with vessels having a delivery element which facilitates delivering the seeds accurately and/or to relatively inaccessible places. Such a delivery element is a relatively long (compared to the dimensions of the vessel) and narrow spout or open channel. Accordingly, the prime objective of the subject invention is to provide a calibrated vessel which has a relatively long delivery element and can be easily filled by dipping it into the material or liquid to be measured and delivered. Other objectives are that the vessel be such that the level of contents is easily discernible and that the vessel be economically manufacturable.

SUMMARY OF THE INVENTION

The subject invention is a calibrated vessel having a combination handle and delivery element. One embodiment, for example, is a calibrated cup for use with birdseed. In this embodiment the vessel is generally cup shaped with a stepped vertical cross sectional shape and a channel shaped spout. Each step in the vessel's shape indicates a specific quantity of contents of the vessel. The length of the spout is greater than the major dimension across the open end of the vessel, a spout length preferably no less than three inches in any case. The spout extends from the lip of the vessel. In use the vessel can be held by grasping the spout and filled to the desired level, by dipping it into a bag of birdseed or it can be filled by pouring granular material or liquid into it. The vessel can then be held by the cup shaped portion so that the contents can be dispensed via the spout. The vessel can be polysided, in which case the contents can be poured from any of the junctures of the flat sides. The subject invention is described in more detail below with reference to the attached drawings.

DETAILED DESCRIPTION OF THE INVENTION

Figure 1:
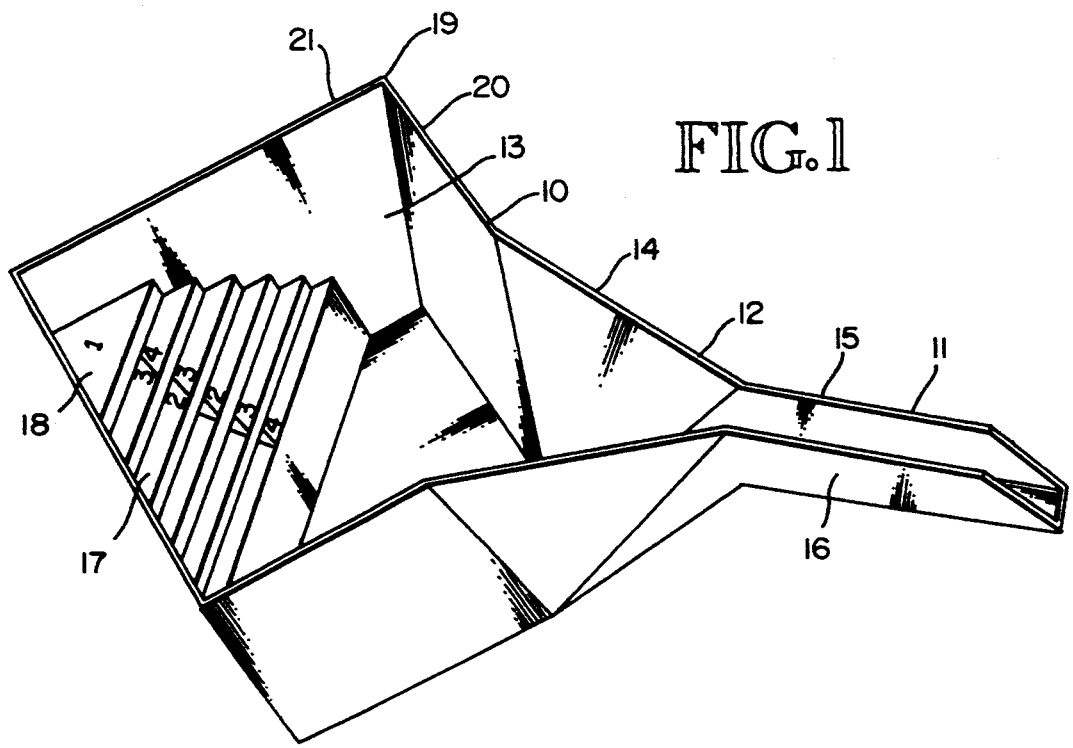
FIG. 1 is a perspective view of a preferred embodiment of the invention.
Figure 2:
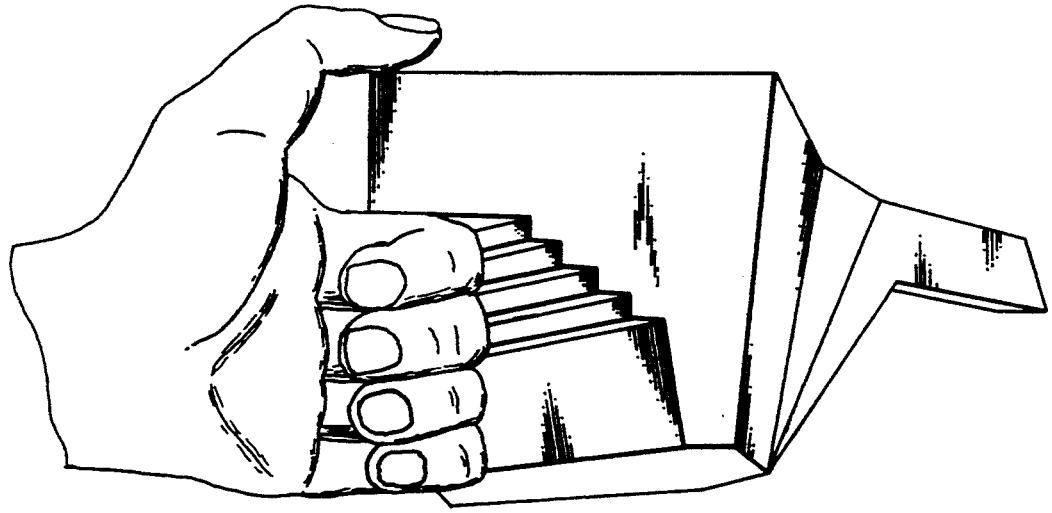
FIG. 2 is a second perspective view of the embodiment of FIG. 1.

The subject invention is a calibrated vessel having a combined handle and spout. In other words, the spout is configured so that it is useful as a handle. The spout may have a closed (tubular) or open (channel shaped) cross section. A preferred embodiment of the invention is shown in FIG. 1. Vessel 10 has a spout 11 extending from lip portion 12 of cup shaped portion 13. The edge 14 of the lip portion and the edges 15 and 16 of the channel shaped spout lie in a plane. Each step, 17 being typical, in stepped portion 18 of the cup shaped portion is at a fractional level of the working capacity of the vessel, in this case one cupful. The working capacity of the vessel is less than the full capacity to minimize spillage when the vessel is used to full working capacity. The quantity held at each step level is indicated on each step. The polysided shape of the vessel is intended to facilitate holding the vessel securely for pouring from it and to facilitate pouring out the contents of the vessel since each juncture of two flat sides forms a rudimentary spout, juncture 19 of sides 20 and 21 being typical. Also, as indicated in FIG. 2, the configuration of the stepped portion facilitates holding the vessel while its contents are being dispensed. The spout serves as a handle while the vessel is being filled or emptied and the generally rectangular cross sectional shape of the spout provides a secure grip.

It is considered to be understandable from this description that the subject invention meets its objectives. It provides a calibrated vessel which has a relatively long delivery element and can be easily filled by dipping it into the granular material or liquid to be measured and dispensed. The level of contents in the vessel is easily discernible and the vessel is economical to manufacture.

It is also considered to be understood that while one embodiment of the invention is described herein, other embodiments and modifications of the one described are possible within the scope of the invention which is limited only by the attached claims.

I claim:

1. A vessel for holding and delivering contents and having a cup shaped portion and a delivery element, said delivery element being configured to serve as a handle for said vessel, said cup portion having an edge lying in a plane and said delivery element having a channel shaped cross section having two edges, said two edges also lying in said plane, said cup shaped portion having a plurality of flat sides, said sides being joined at a plurality of junctures whereby said junctures facilitate pouring from said vessel with said delivery element serving as a handle, and said vessel having a working capacity and in which one of said plurality of flat sides has a plurality of steps such that each step indicates a fraction of said working capacity and said side having said plurality of steps facilitates holding said vessel with said delivery element being used to deliver said contents from said vessel.

* * * * *